No. 840,229. PATENTED JAN. 1, 1907.
W. B. MOSS.
THINNER.
APPLICATION FILED OCT. 27, 1906.
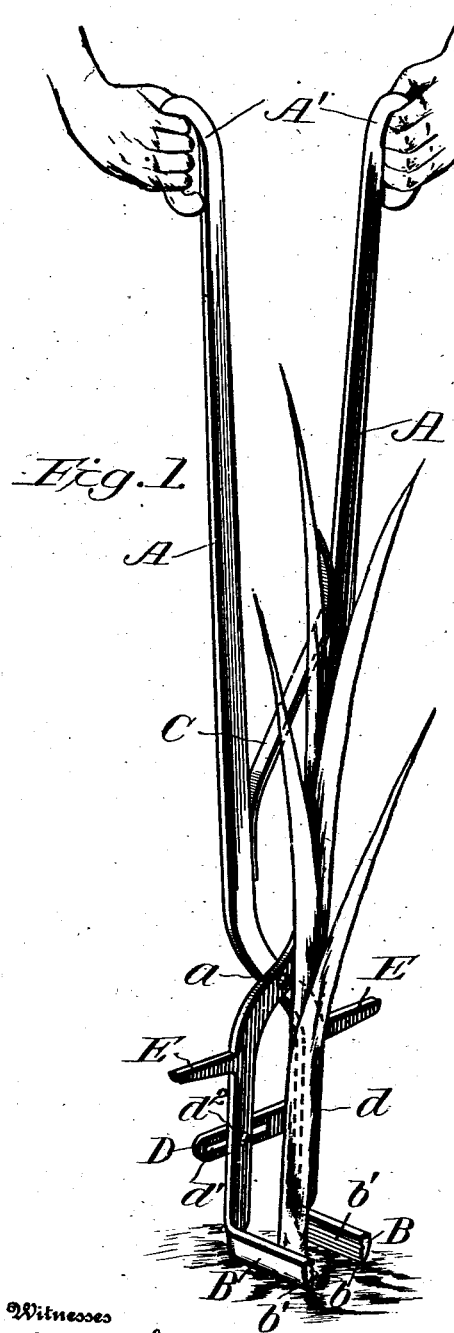
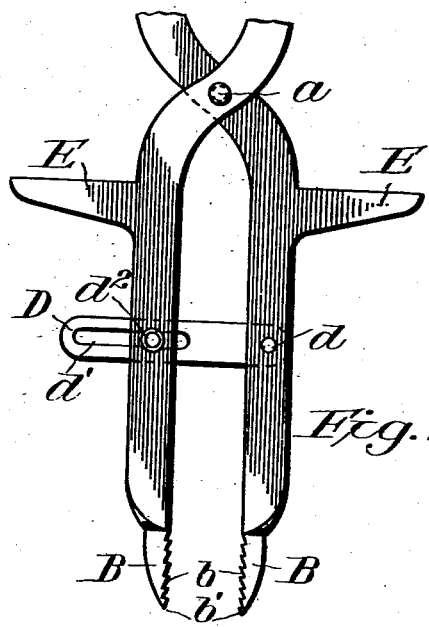
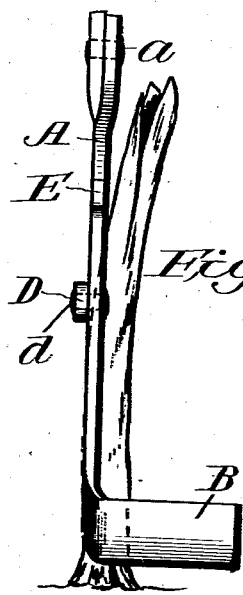
Witnesses
C. H. Walker
James R. Mansfield
Inventor
William B. Moss
By Alexander Dowell
Attorneys

UNITED STATES PATENT OFFICE.

WILLIAM B. MOSS, OF LANCASTER, KENTUCKY.

THINNER.

No. 840,229.  Specification of Letters Patent.  Patented Jan. 1, 1907.

Application filed October 27, 1906. Serial No. 340,837.

*To all whom it may concern:*

Be it known that I, WILLIAM B. MOSS, of Lancaster, in the county of Garrard and State of Kentucky, have invented certain new and useful Improvements in Thinners; and I hereby declare that the following is a full, clear, and exact description thereof, reference being had to the accompanying drawings, which form part of this specification.

This invention is an improved implement for thinning corn, pulling weeds, and transplanting plants; and its object is to provide a simple effective implement by which such work can be accomplished with less bodily exertion and weariness than is now attendant thereon as ordinarily performed.

To this end the invention consists in the novel construction of the implement as illustrated in the accompanying drawings and hereinafter described and claimed.

In said drawings, Figure 1 is a view of the complete tool, indicating its mode of use. Fig. 2 is an enlarged front view thereof. Fig. 3 is an enlarged detail.

The implement roughly resembles a long pair of pliers and has handle-levers A A, which are pivotally connected by a rivet or screw $a$ at a point preferably nearer their lower than their upper ends.

The lower ends of the levers below the pivot are provided with forwardly-projecting jaws B. The jaws should be about three inches in length and are preferably thinned or sharpened on their lower edge, as at $b$, being made thinner at bottom than at top, so that they will more readily enter the ground. These jaws are preferably serrated or roughened on their inner faces, as at $b'$, to enhance their grip upon an object.

The jaws B are normally separated by means of a spring, (shown at C,) which is preferably arranged between the handle-levers above the pivot $a$.

Excessive opening movement of the jaws is prevented by a stop-bar D, which may be pivoted to one lever above its jaw B, as at $d$, and extends across to the opposite lever and is provided with a slot $d'$, engaging a pin or rivet $d^2$ on the latter lever. This bar D is not only useful to limit the opening movement of the jaws, but it also serves as a guard or stop to facilitate locating the jaws in position to grasp a blade or stalk of the superfluous corn or like object, as indicated in Fig. 3, so that the jaws can be readily adjusted to position to grasp an object, as the bar will prevent the jaws slipping past the object or prevent the object passing back between or through the jaws.

The lower portion of one or both of the levers can be provided at a suitable point above the jaws B and bar D with foot-plates E, which may be formed on or attached to the levers, so that the operator can, if he desires, use his foot to force the implement's jaws into the earth.

The upper ends of the handle-levers may be provided with any suitable hand pieces or loops, as indicated at A' in the drawings, to facilitate manipulation of the implement.

With this device an operator can easily pull corn, roots, and other plants out of the ground without having to bend over to do so, as he would have to do if pulling by hand, which bending renders long-continued work of this latter kind very wearisome and painful.

Having described my invention, what I claim as new, and desire to secure by Letters Patent, is—

1. An implement of the character specified, comprising opposite pivoted levers provided with forwardly-projecting jaws on their lower ends, and a stop-bar attached to one of said levers above the jaws and adapted to limit the opening of the jaws and to position the jaws relatively to an object so that the jaws cannot be moved forwardly past the object between them, substantially as described.

2. An implement of the character specified, comprising opposite pivotally-connected handle-levers provided with forwardly-extending jaws on their lower ends, and a stop-bar connected to the levers below the pivot and above the jaws and adapted to prevent the jaws being moved forwardly past an object coming between the jaws, and to position the jaws properly for grasping such object.

3. An implement comprising a pair of opposite pivotally-connected handle-levers having forwardly-projecting jaws on their lower ends, roughened on their inner faces, a stop-bar connected to the levers above the jaws and below the pivot, and a spring interposed between the levers above the pivot.

4. An implement for the purpose specified, comprising a pair of opposite handle-levers pivotally connected near their lower ends and having forwardly-projecting jaws on their lower ends, a stop-bar connected to the levers above the jaws and below the pivot; foot-plates on the levers above the jaws, and a spring interposed between the levers above the pivot.

In testimony that I claim the foregoing as my own I affix my signature in presence of two witnesses.

WILLIAM B. MOSS.

Witnesses:
C. A. ARNOLD,
H. C. DUNN.